A. H. CANFIELD.
REVERSIBLE VALVE FOR FLUSHING TANKS.
APPLICATION FILED JAN. 2, 1909.
926,239.
Patented June 29, 1909.
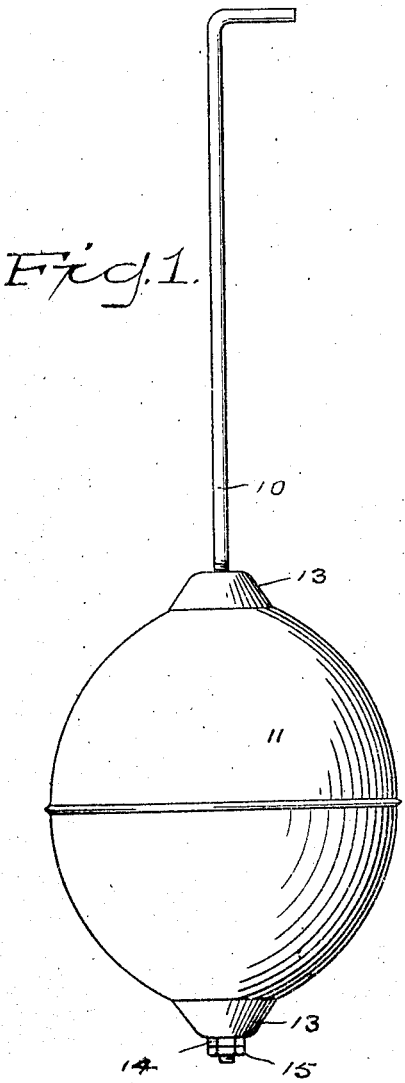
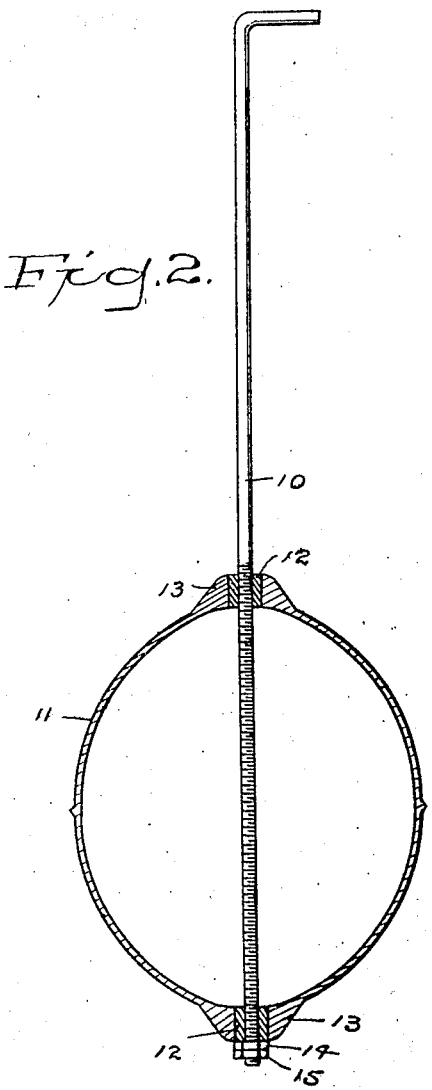

UNITED STATES PATENT OFFICE.

ALBERT H. CANFIELD, OF BRIDGEPORT, CONNECTICUT, ASSIGNOR TO THE H. O. CANFIELD COMPANY, OF BRIDGEPORT, CONNECTICUT, A CORPORATION OF CONNECTICUT.

REVERSIBLE VALVE FOR FLUSHING-TANKS.

No. 926,239.  Specification of Letters Patent.  Patented June 29, 1909.

Application filed January 2, 1909. Serial No. 470,334.

*To all whom it may concern:*

Be it known that I, ALBERT H. CANFIELD, a citizen of the United States, residing at Bridgeport, county of Fairfield, State of Connecticut, have invented a new and useful Reversible Valve for Flushing-Tanks, of which the following is a specification.

This invention relates to float valves adapted for general use as in the flushing tanks of water-closets, and has for its object to provide a reversible valve of this character that will be simple and inexpensive to produce, will not collapse or flatten out in use and will not become loose on the rod through the swirl of the water.

With these and other objects in view I have devised the novel valve made alike at both ends and both ends of which are adapted to be rigidly attached to the rod, which I will now describe, referring to the accompanying drawing forming a part of this specification and using reference characters to indicate the several parts.

Figure 1 is an elevation of my novel valve in place on a rod, and Fig. 2 is a vertical section thereof.

10 denotes the rod and 11 the valve which is made of rubber, may be made of any ordinary or preferred configuration, for example the configuration shown in the drawing, and is preferably made alike at both ends. At each end of the valve is a threaded spud or nut indicated by 12 which is firmly seated in a hub of rubber indicated by 13. The rod passes entirely through the valve from end to end and is threaded to engage both spuds. At the lower end of the rod below the valve I place a nut 14 and a set nut 15.

The threaded spuds are molded into the hubs of rubber at the ends of the valve in the process of manufacture. In assembling, the rod is turned through both spuds and passes through the valve from end to end. This operation may be performed by hand but is preferably performed mechanically. The nuts are then turned successively onto the projecting lower end of the rod. The use of a nut and set nut anchors the valve securely on the rod and prevents it from becoming loosened in use by the swirl of the water. By giving to the valve a rigid attachment at both ends to the rod I effectually prevent the valve from collapsing in use, my novel valves in practice wearing for an almost unlimited length of time. In assembling, it makes no difference which end of the valve is placed inward on the rod and should there be wear of the valve or seat (not shown) the valve may be readily reversed upon the rod and will be in fact a new valve.

Having thus described my invention I claim:

1. A valve of the character described having a threaded spud molded into each end thereof.

2. The combination with a threaded rod, of a rubber valve having spuds molded into each end thereof with which the rod engages.

3. The combination with a threaded rod and a rubber valve having spuds in each end thereof through which the rod passes and a nut and set nut at the end of the rod below the valve.

In testimony whereof I affix my signature in presence of two witnesses.

ALBERT H. CANFIELD.

Witnesses:
 FRANK M. BULKLEY,
 HARRISON A. MORSE.